US011949522B2

United States Patent
Tian et al.

(10) Patent No.: US 11,949,522 B2
(45) Date of Patent: Apr. 2, 2024

(54) ADAPTIVE BACKOFF TIME IN POWER-OVER-ETHERNET DETECTION CYCLES

(71) Applicant: Hewlett Packard Enterprise Development LP, Houston, TX (US)

(72) Inventors: Shiyu Tian, Singapore (SG); Kah Hoe Ng, Singapore (SG); Hong Yi Wee, Singapore (SG)

(73) Assignee: Hewlett Packard Enterprise Development LP, Spring, TX (US)

( * ) Notice: Subject to any disclaimer, the term of this patent is extended or adjusted under 35 U.S.C. 154(b) by 420 days.

(21) Appl. No.: 17/395,075

(22) Filed: Aug. 5, 2021

(65) Prior Publication Data

US 2023/0038813 A1 Feb. 9, 2023

(51) Int. Cl.
*H04L 12/10* (2006.01)
*H04L 12/04* (2006.01)
*H04L 12/06* (2006.01)

(52) U.S. Cl.
CPC .............. *H04L 12/10* (2013.01); *H04L 12/04* (2013.01); *H04L 12/06* (2013.01)

(58) Field of Classification Search
CPC . G06F 1/26; G06F 1/263; G06F 1/266; H04L 12/04; H04L 12/06; H04L 12/10
See application file for complete search history.

(56) References Cited

U.S. PATENT DOCUMENTS

| 7,355,416 | B1* | 4/2008 | Darshan .................. H04L 12/10 |
| | | | 713/340 |
| 9,377,794 | B1* | 6/2016 | Dwelley .................. G05F 1/462 |
| 10,764,071 | B1* | 9/2020 | Ciholas ............... G06F 11/3058 |
| 2011/0258464 | A1* | 10/2011 | Gammel ........... H04L 12/40045 |
| | | | 713/300 |
| 2015/0130269 | A1* | 5/2015 | Barrass ............. H04L 12/40045 |
| | | | 307/1 |
| 2017/0214533 | A1* | 7/2017 | Chen ........................ H04L 12/10 |
| 2017/0230080 | A1* | 8/2017 | Tarn .......................... H04B 3/54 |
| 2018/0176026 | A1* | 6/2018 | Yseboodt .................. H02J 3/02 |
| 2020/0044874 | A1* | 2/2020 | Xu ......................... G06F 1/3209 |
| 2021/0099165 | A1* | 4/2021 | Horváth .................. H04L 12/10 |

(Continued)

*Primary Examiner* — Jaweed A Abbaszadeh
*Assistant Examiner* — Cheri L Harrington
(74) *Attorney, Agent, or Firm* — Park, Vaughan, Fleming & Dowler LLP (57) ABSTRACT

One aspect provides a power sourcing equipment controller for providing power to a powered device using power-over-Ethernet (PoE). The power sourcing equipment includes a voltage-output logic block to output a sequence of voltage signals, the voltage signals comprising at least a detection signal and a classification signal; a current-measurement logic block to measure current provided responsive to the voltage signals; a backoff-time-determination logic block to determine a backoff time in response to the current-measurement logic block detecting the provided current exceeding a predetermined threshold, the backoff time being determined based on an amount of time needed for discharging an internal capacitor associated with the powered device; and a timing logic block to cause the voltage-output logic block to delay the output of a next sequence of voltage signals based on the determined backoff time, thereby facilitating powering up of a device compliant with a different PoE standard.

20 Claims, 7 Drawing Sheets

(56) References Cited

U.S. PATENT DOCUMENTS

2023/0038813 A1* 2/2023 Tian .................. H04L 12/40045
2023/0104407 A1* 4/2023 Wendt ................... H04L 49/351
                                                              713/340

* cited by examiner

ADAPTIVE BACKOFF TIME IN POWER-OVER-ETHERNET DETECTION CYCLES

BACKGROUND

Field

This disclosure is generally related to power over Ethernet. More specifically, this disclosure is related to a system and method for adaptively adjusting the backoff time for detection cycles when an earlier generation powered device (PD) is plugged in to a newer generation power sourcing equipment (PSE).

BRIEF DESCRIPTION OF THE FIGURES

In the figures, like reference numerals refer to the same figure elements.

DETAILED DESCRIPTION

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

Power over Ethernet (PoE) provides a way to safely pass electrical power along with data via an Ethernet cable, such as a category 5 cable. This allows client devices (e.g., wireless access points, sensors, voice over Internet Protocol (VoIP) phones, etc.) to receive electrical power without having to place the device near a power outlet.

The common techniques for transmitting power over Ethernet cabling have been standardized by Institute of Electrical and Electronics Engineers (IEEE) standard IEEE 802.3 since 2003. The original IEEE 802.3af-2003 PoE standard provides up to 13 W of DC power on each port and the updated IEEE 802.3at-2009 PoE standard (also known as PoE+) provides up to 25.5 W of power. The subsequent IEEE 802.3bt-2018 standard (also known as PoE++ or 4PPoE) further expanded the power capabilities of 802.3at and introduced two additional power types, with Type 3 providing up to 51 W of power and Type 4 providing up to 71.3 W of power.

As the PoE technologies evolve over time to provide higher power output, equipment compatibility can become an issue. A network device powered by PoE is referred to as a powered device (PD), and a device that provides power is called a power sourcing equipment (PSE) device. A PoE-enabled network switch can be an example of a PSE device and can power connected devices (e.g., VoIP phones or IP security cameras). In addition, a PoE injector can be used to provide power to a network device connected to a non-PoE-enabled network switch (e.g., by being placed between the non-PoE-enabled switch and a PD). Depending on the design, a PD or PSE device can be compliant with either an earlier PoE standard (e.g., 802.3af or 802.3at) or a later PoE standard (e.g., 802.3bt). Although the later PoE standards are developed based on earlier standards and are trying to maintain backward compatibility, new techniques and terminologies are being introduced in later versions of the PoE standards, and devices that were developed based on an older PoE standard may not be designed to handle certain unforeseen cases included in the newer standards. For example, the signaling between the PSE devices and the PDs is different for different types of devices, when the PSE and PD are mismatched (i.e., the PSE and the PD are of different types, and in particular, they may be compliant with different standards), the PSE may fail to provide power to the PD. In this disclosure, a type 1 device that is developed based on the earlier IEEE standard (e.g., 802.3af) can be referred to as a legacy type 1 device.

To enable a legacy type 1 PD to be powered up by newer generation PSEs, an existing approach allows a PSE controller to enter a legacy mode (e.g., by enabling a "legacy enable" register bit). While in the legacy mode, the PSE will add a sufficiently long fixed delay (e.g., between two and four seconds) between the detection-and-classification cycles. This long delay can ensure that the previously charged internal capacitor on the PD discharges completely, thus preventing the detection error during the subsequent detection-and-classification operation. In addition, the PSE can measure the capacitance presented by the PD and will report a PD with a relatively large common mode capacitance (e.g., 150 nF) as a valid PD. However, there are a few drawbacks to this solution. First, setting the register bit in the PSE controller often requires a manual operation, which can be cumbersome and time consuming. Second, the amount of fixed delay between the detection-and-classification cycles is chosen to make sure the solution can work for many different scenarios; hence, it can be excessively long for certain situations. The excessively long delay between the detection-and-classification cycles can result in a prolonged wait for the PD to be powered up. Last, this approach may allow a faulty PD to turn on, because at the legacy mode, the PSE may accept certain abnormal detection results as normal. Powering on a faulty PD may cause damage to the PSE.

To prevent the abovementioned problems, one aspect of this application provides a solution to adaptively adjust the backoff time of a subsequent detection stage, which in this case is part of the coherence-checking procedure. More specifically, instead of applying a fixed delay, the PSE controller can determine the amount of time needed to discharge the internal capacitor of the PD and then back off the subsequent detection stage only by the determined amount of time (e.g., delaying the injection of the detection voltage). This way the capacitor in the PD can be sufficiently discharged before the next detection stage, which is part of the coherence-checking operation. When detection is performed again in the coherence-checking stage, the PD can produce a valid detection signature and the PSE controller can then proceed to power on the PD. Because the delay of the next detection stage is limited to the amount of time needed for discharging the capacitor, the total time needed to power up the PD can be reduced.

Figure 1:
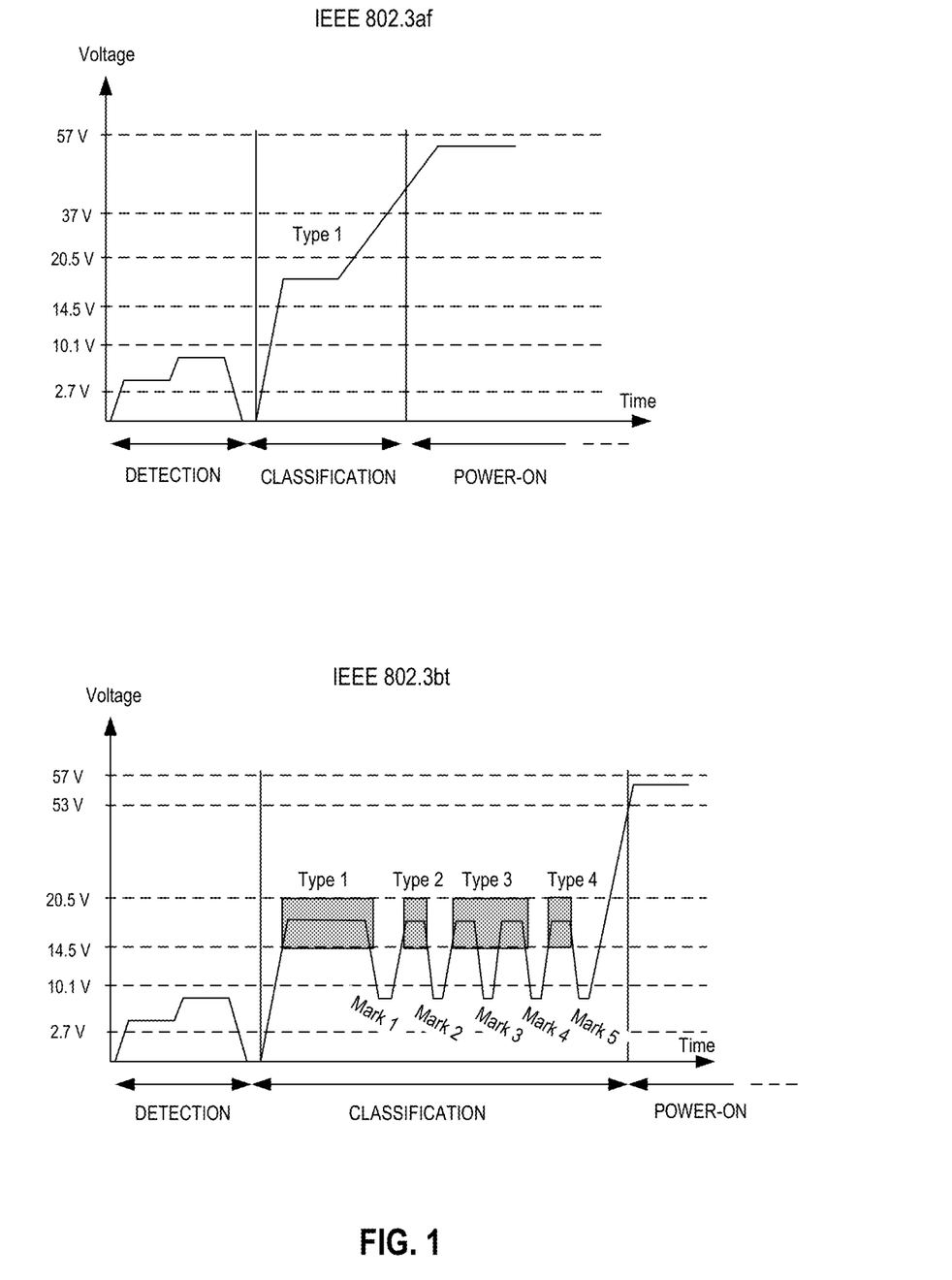
FIG. 1 illustrates the signaling between power sourcing equipment (PSE) and the powered device (PD) defined by the IEEE power-over-Ethernet (PoE) standards.

FIG. 1 illustrates the signaling between power sourcing equipment (PSE) and the powered device (PD) defined by the IEEE PoE standards. More specifically, the top drawing shows the signaling defined by the IEEE 802.3at standard, and the bottom drawing shows the signaling defined by the IEEE 802.3bt standard. The signaling between the PSE and the PD allows the presence of a conformance device (e.g., a PoE-enabled network device) to be detected by the power source, and allows the device (i.e., the PD) and the source (i.e., the PSE) to negotiate the amount of power required or available.

For both protocols, a PD can go through three phases after being connected (e.g., plugged in) to a PSE: a detection phase, a classification phase, and a power-on phase.

During the detection phase, the PSE detects if a PD is connected by applying a voltage between 2.7 and 10.1 V. To allow the PSE to detect the PD, the PD needs to present a 25 kΩ resistance. In the example shown in FIG. 1, a multi-point detection scheme is used, where a multi-level detection voltage is applied.

Once a valid PD is detected, the PSE and PD enter the classification phase, during which the PSE and PD conduct an analog handshake to allow the PD to request a power class and the PSE to respond with the class the PD is granted. Class refers to the minimum power the PSE guarantees the PD to receive and the maximum power the PD is allowed to draw.

For devices complying with the 802.3af protocol, a simplest classification handshake is performed. The top drawing in FIG. 1 shows that, during the classification phase, the PSE applies a voltage between 15.5 and 20.5 V. The PSE can measure the current drawn from the PD to determine the requested class. If it has sufficient power, the PSE powers up the PD in the subsequent power-on stage. Otherwise, the PSE does not power the PD.

However, for devices complying with the 802.3bt protocol, the classification handshake can be more complicated. The bottom drawing in FIG. 1 shows that, during the classification phase, the PSE applies multiple (e.g., five) pulses, with each pulse being defined by a higher level voltage (known as a class event) and a lower mark level (known as a mark event). In this example, the PSE is a type 4 PSE, and it provides five consecutive pulses, with the first pulse being the longest. A PD can draw different amounts of current during the different events to allow the PSE to determine the class of power required by the PD.

The difference in the classification handshake process between different PoE protocols can sometimes cause problems. For example, a PD can be a device that complies with the earlier 802.3af protocol (i.e., the PD is a legacy type 1 device), and the legacy type 1 PD can be connected to a more recent PSE that complies with the later 802.3bt protocol. As shown in the bottom drawing of FIG. 1, a type 3 or type 4 PSE (which complies with the IEEE 802.3bt standard) will inject, after the detection stage, a number (e.g., four or five) of pulses into the connecting Ethernet cable, depending on the detected type of the connected PD device. For example, if the PSE detects that the connected PD is a type 1 device, only one pulse will be injected into the Ethernet cable, as shown in the bottom drawing of FIG. 1. However, this pulse is different from the classification voltage shown in the top drawing of FIG. 1. More specifically, in addition to the high voltage class event, this pulse also includes a low voltage mark event. The legacy type 1 PD is configured to power on (i.e., start to draw current from the cable) right after the class event, as shown in the top drawing of FIG. 1. This power-up attempt is unexpected to the type 3 or type 4 PSE, as the PSE is providing the lower mark voltage after the higher class voltage, and will cause the current flowing into the PD to oscillate. This peak value of this oscillating current can be significantly larger than what the PSE is expecting during the mark event.

Figure 2:
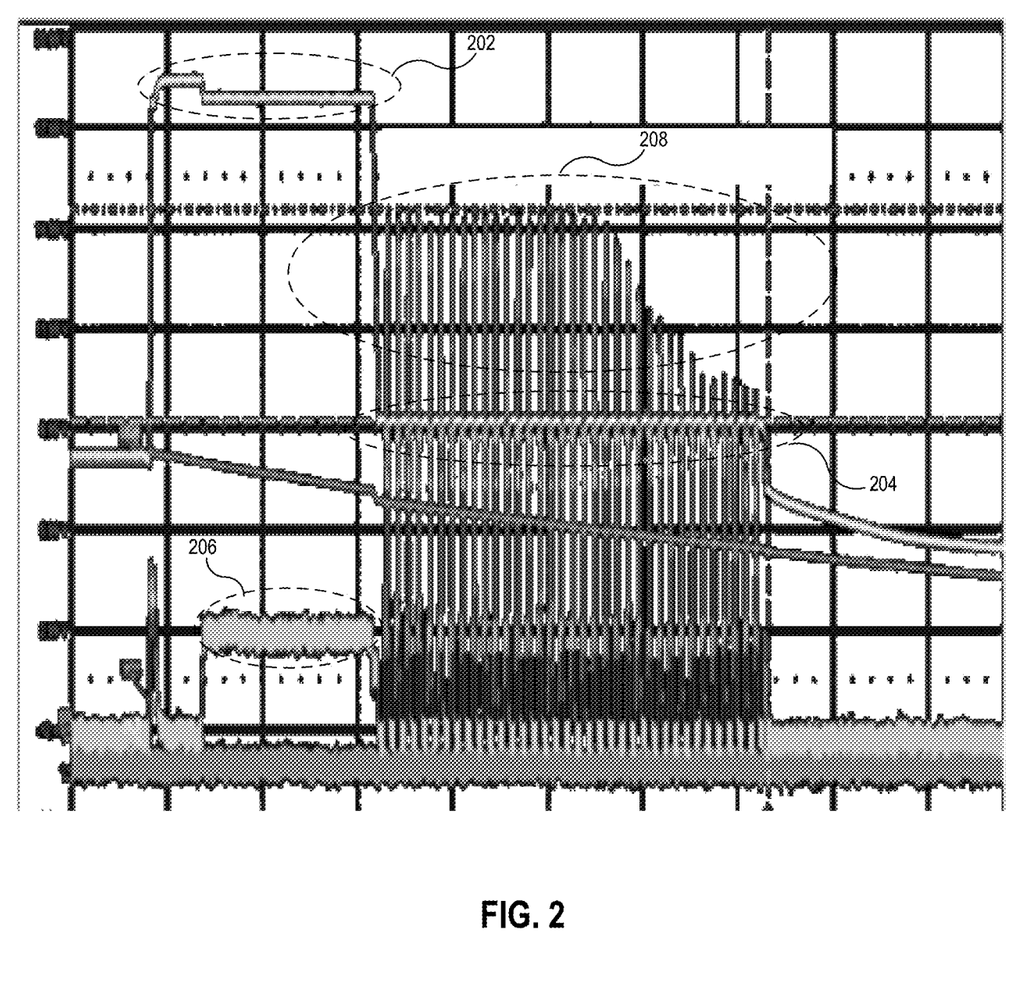
FIG. 2 illustrates the voltage and current values detected at a type 1 PD when the type 1 PD is connected to a type 3 or 4 PSE.

FIG. 2 illustrates the voltage and current values detected at a type 1 PD when the type 1 PD is connected to a type 3 or 4 PSE. FIG. 2 shows a class event 202 (i.e., a high voltage) followed by a mark event 204 (i.e., a low voltage). FIG. 2 also shows that the current response 206 on the PD during class event 202 can be roughly a constant. The level of current response 206 indicates the power class requested by the PD. For example, a PD may draw about 10 mA current to request class 1 power or about 30 mA current to request class 3 power.

For the type 1 PD connected to the PSE, after class event 202, the type 1 PD attempts to turn on (e.g., draw a relatively large current from the PSE). However, this is unexpected to the PSE and, as the PSE attempts to regulate the amount of current flowing to the type 1 PD, the current starts to oscillate (e.g., the current value goes up and then falls to zero and so on), shown as current spikes 208 in FIG. 2. This oscillating current can charge an internal capacitor in the type 1 PD. This capacitor can protect the PD from damage caused by voltage surges. However, if this capacitor is charged during the mark event, it can create a problem at a subsequent detection stage.

IEEE standard 802.3bt defines two types of PDs, the single-signature PD and the dual-signature PD. A single-signature PD is an 802.3bt-enabled PD that shares the same detection signature, classification signature, and maintain-power signature between both modes (alternative A and alternative B), whereas a dual-signature PD is an 802.3bt-enabled PD that has independent signatures between the two modes. As a result, the 802.3bt detection process has been expanded to be able to differentiate, not only that the connected PD is a valid PoE PD (i.e., it is compliant with one of the PoE standards), but also to determine whether a single- or dual-signature PD is connected. To do so, the detection phase now includes a Connection Check (CC) stage.

Figure 3A:
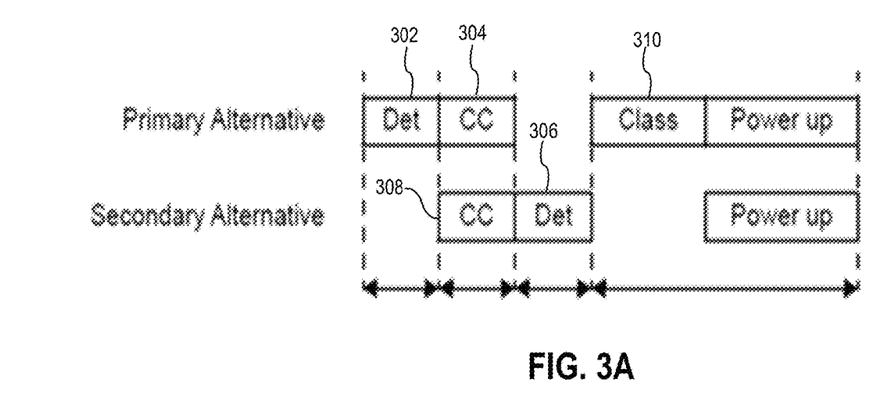
FIG. 3A illustrates an exemplary timing sequence of the signaling between the PSE and a single-signature PD.

For a legacy type 1 PD (e.g., an 802.3af-compliant PD), at the Connection Check stage, the 802.3bt PSE will always determine that the PD is a single-signature PD. When the 802.3bt PSE determines that the PD is a single-signature PD, the 802.3bt PSE can apply signaling (e.g., detection and classification voltages) on the two modes (alternative A and alternative B) in a staggered manner. FIG. 3A illustrates an exemplary timing sequence of the signaling between the PSE and a single-signature PD. As shown in FIG. 3A, on pairsets of the primary alternative (which can be alternative A or B), a detection (DET) stage 302 (where the PSE applies a detection (DET) signal to the PD) is followed by a connection-check (CC) stage 304. On pairsets of the secondary alternative, a detection stage 306 follows a connection-check stage 308. A classification stage 310 (where the PSE applies class and mark signals to the PD) occurs on the pairsets of the primary alternative. As discussed previously and as shown in FIG. 2, current spikes can occur on the PD during classification stage 310, if the PD is a type 1 PD that attempts to power up during the mark event within classification stage 310. This current can charge the internal capacitor of the PD.

What is not shown in FIG. 3A is an additional "coherence checking" procedure, which is to repeat the detection and classification stages to prevent a "mid-plug" event. A mid-plug event refers to the situation where the PD is unplugged during the negotiation process. During "coherence checking," the detection voltage signal (e.g., a multi-level voltage signal between 2.7 and 10.1 V) is applied again by the PSE to the PD and the current on the PD is measured to determine if the PD is a valid device. If the internal capacitor of the PD is charged (e.g., for legacy type 1 PDs), a much larger current response will be measured, which is beyond the expected range of a valid PD. This means that the PD cannot provide a valid detection signature and, consequently, the PSE stops to output power.

Figure 3B:
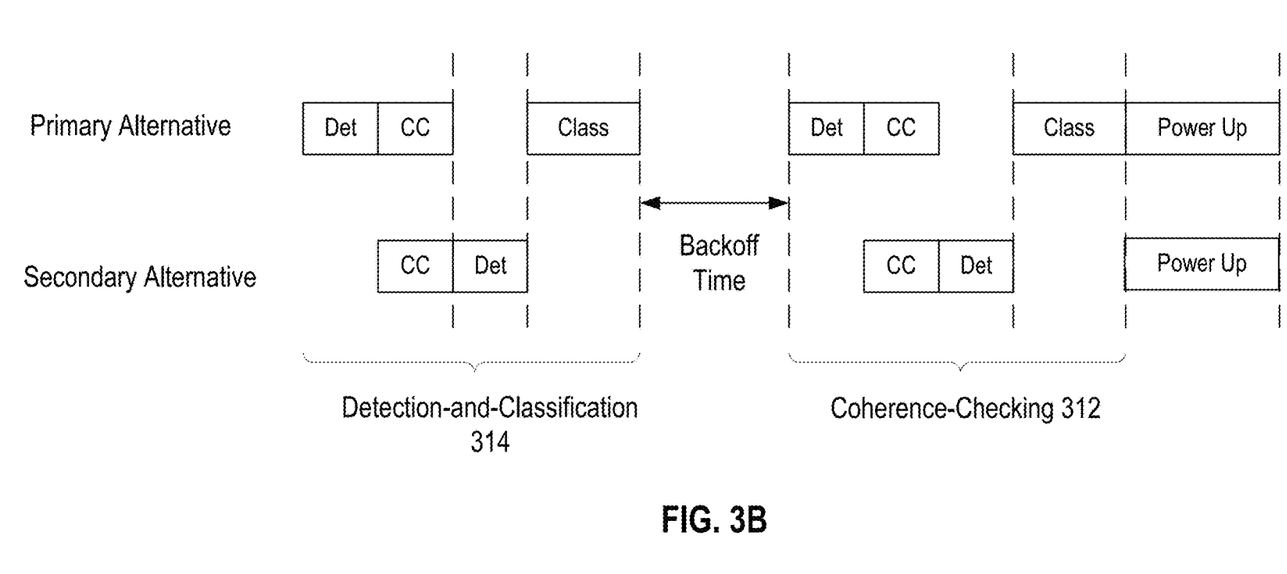
FIG. 3B illustrates an exemplary timing sequence of the signaling between the PSE and a single-signature PD, according to one aspect of the application.

FIG. 3B illustrates an exemplary timing sequence of the signaling between the PSE and a single-signature PD, according to one aspect of the application. In FIG. 3B, a coherence-checking stage 312 is also included, where the detection and classification is repeated to detect a mid-plug event. A time interval between the detection stage of the detection-classification cycle in coherence-checking stage 312 and the classification stage of the previous detection-and-classification cycle 314 can be referred to as the detection backoff time. During this interval, no voltage is injected and the PD is not drawing current. Consequently, the PD's capacitor will slowly discharge. However, unless the capacitor is completely discharged during this time, a detection error can occur during the detection-classification cycle in coherence-checking stage 312. Note that not all type 1 PDs suffer from this detection problem. Some type 1 PDs are able to handle the type 3 and 4 responses better and can be powered up correctly by type 3 or 4 PSEs. However, certain legacy type 1 PDs (e.g., certain IP phones) cannot be powered up by newer PSEs due to detection errors.

According to one aspect of this application, when the newer version PSE detects that the capacitor in a coupled PD may be charged (e.g., by detecting an abnormal mark current), to prevent a detection error in the next detection-and-classification cycle, the subsequent detection stage can be adaptively delayed based on the amount of time needed to discharge the capacitor. In a particular aspect of this application, the amount of time needed to discharge the capacitor can be computed based on the amount of charge accumulated on the PD's capacitor and the time constant of the discharging circuit. In one aspect of this application, the time constant of the discharging circuit can be computed by estimating the port capacitance $C_{port}$. In one example, $C_{port}$ may be estimated based on the inrush current (which is the initial current drawn by the PD), the inrush time duration, and the voltage applied to the PD. Moreover, the amount of charge accumulated on the PD can be computed based on the duration of the mark event where the capacitor is being charged as well as the time constant.

In a further aspect, the PSE may be able to reduce the amount of charge accumulated on the PD's capacitor, thus reducing the time needed for discharging the capacitor. This way, the backoff time of the "coherence checking" can also be reduced, thus facilitating faster powering up of the PD. To do so, the PSE can monitor the average current on the PD during the mark event. If the average current on the PD exceeds a predetermined threshold (e.g., twice the amount of the maximum mark current ($I_{mark}$) defined by the standard), the PSE can terminate the current mark event (i.e., the PSE can stop outputting $V_{mark}$). In one alternative, the PSE can observe the current oscillation on the PD and, in response to detecting the peak of the current oscillation exceeding a predetermined threshold (e.g., five times the maximum value of $I_{mark}$), the PSE can terminate the mark event. Upon terminating the mark event, the PSE can compute the total duration of the mark event in order to determine the voltage or charge on the PD's capacitor, which in turn can be used to determine the amount of time needed to discharge the capacitor. In one example, the PSE monitors the current oscillation and counts the number of current spikes. This number, along with the maximum value of the input capacitance of the PD, can be used to estimate the total time needed for discharging the PD's capacitor. The backoff time for the "coherence checking" procedure (i.e., the backoff time of the subsequent detection stage) can be determined by adding a predetermined buffer time to this estimated total time. The buffer time can be a fixed value (e.g., a few hundred milliseconds) or the buffer time can depend on the discharge time (e.g., between 10% and 20% of the discharge time).

Figure 4:
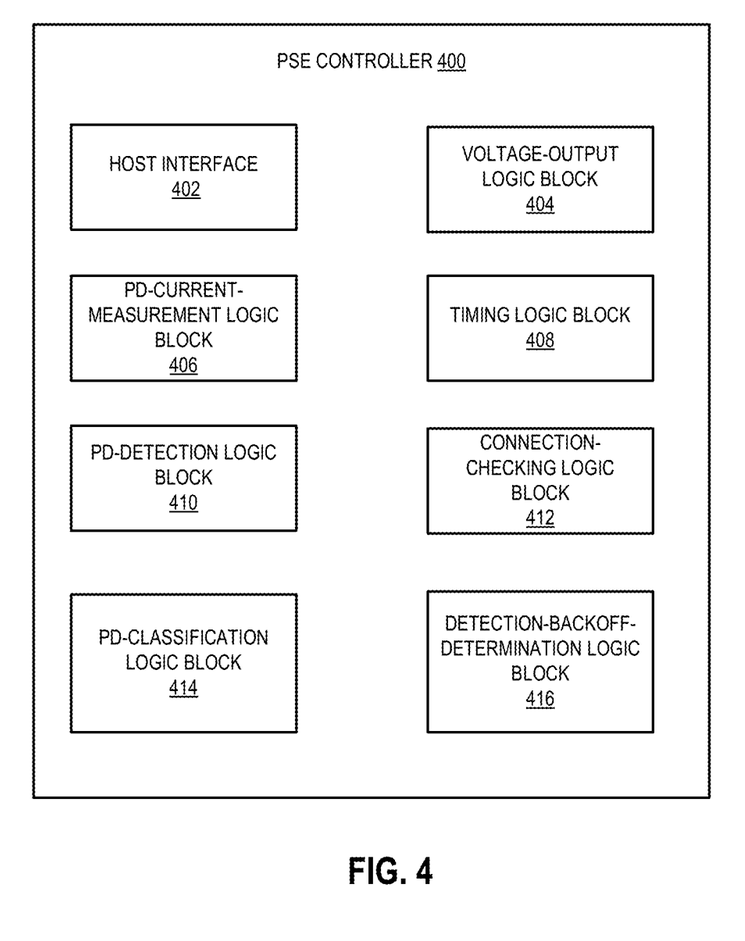
FIG. 4 illustrates a block diagram of an exemplary PSE controller, according to one aspect of the application.

FIG. 4 illustrates a block diagram of an exemplary PSE controller, according to one aspect of the application. A PSE controller can be a device or apparatus that is responsible for detecting and classifying PDs, as well as sourcing the right amount of power to PDs over Ethernet cables. In this disclosure, the term "PSE controller" and the term "PSE" can be interchangeable. In FIG. 4, PSE controller 400 can include a host interface 402, a voltage-output logic block 404, a PD-current-measurement logic block 406, a timing logic block 408, a PD-detection logic block 410, a connection-checking logic block 412, a PD-classification logic block 414, and a detection-backoff-determination logic block 416.

Host interface 402 facilitates communication between a host controller (e.g., a remote computer) and PSE controller 400. More specifically, the host controller can digitally configure PSE controller 400 or query status of the different ports via host interface 402. In other words, host interface 402 allows PSE controller 400 to be controlled by software. For example, if PSE controller 400 reports an error, software running on the host controller can analyze the error and issue commands to PSE controller 400 based on the error. In an example, host interface 402 can include a serial interface (e.g., an Inter-Integrated Circuit ($I^2C$) interface).

Voltage-output logic block 404 can output various types of voltage signal to the PD over the Ethernet cable. The voltage signal can have different levels at different stages. For example, during the detection stage, the voltage signal outputted by voltage-output logic block 404 can be between 2.7 V and 10.1 V, whereas during the power-on stage, the voltage signal outputted by voltage-output logic block 404 can be greater than 50 V. In one aspect, PSE controller 400 can have multiple ports (e.g., four ports) that are coupled to multiple PDs, and voltage-output logic block 404 can provide voltage to each port independently.

PD-current-measurement logic block 406 can measure the amount of current drawn from the PD. In one aspect, PD-current-measurement logic block 406 may monitor the current on each port by polling the current at a predetermined interval (e.g., several tens of milliseconds). In a further aspect, PD-current-measurement logic block 406 may monitor the current on each port by averaging the current over a predetermined interval (e.g., several tens of milliseconds). Monitoring the current in real time can allow PSE controller 400 to anticipate a detection error before it really happens. Timing logic block 408 can control the timing of voltage signals outputted by voltage-output logic block 404 as well as the timing for performing current measurement by PD-current-measurement logic block 406. For a single-signature PD, timing logic block 404 can also determine the sequence of events occurring on different pairsets (e.g., the timing sequence shown in FIG. 3).

PD-detection logic block 410 can determine whether a valid PD is connected to a port on PSE controller 400. More specifically, PD-detection logic block 410 can determine whether a valid detection signature (e.g., a current value within a predetermined range) is presented by the connected PD during the detection stage (e.g., when voltage-output logic block 404 outputs a detection voltage). If the current on the PD is within the predetermined range, PD-detection logic block 410 determines that a valid PD is detected; otherwise, PD-detection logic block 410 determines that no valid PD is detected.

Connection checking logic block 412 can determine whether a connected PD is a single-signature PD or double-signature PD. Depending on the outcome of the connection checking, voltage-output logic block 404 can output voltages to different pairsets in different manners. PD-classification logic block 414 can determine the power class requested by the PD.

Detection-backoff-determination logic block 416 can determine the amount of delay needed to ensure a successful detection of a legacy type 1 PD. In one aspect, detection-backoff-determination logic block 416 can start from a minimum backoff time (i.e., the minimum amount of time delay needed between the initial detection-classification cycle and a subsequently repeated detection-classification cycle), which can be a few hundred milliseconds, and incrementally add delays (e.g., by a predetermined amount) to the coherence checking until the PD is successfully powered up or until a predetermined maximum value (e.g., two or four seconds) of the backoff time is reached. If the maximum backoff time is reached and the PD fails to be powered up, detection-backoff-determination logic block 416 can report an error. Subsequent to successful powering up of the PD, detection-backoff-determination logic block 416 can reset the backoff time to its default value, which can be the minimum backoff time.

In further aspects, instead of using iteration, detection-backoff-determination logic block 416 can determine an adaptive detection backoff time by computing the amount of time needed for discharging the capacitor of the legacy type 1 PD and optionally adding a fixed or adaptive amount of buffer. Detection-backoff-determination logic block 416 can also compare the computed adaptive detection backoff time with the minimum backoff time and use the longer one of the two to back off the subsequent detection-classification cycle. For example, detection-backoff-determination logic block 416 can output the determined backoff value to timing logic block 408 to control the timing of the next detection voltage outputted by voltage-output logic block 404, thus preventing the detection error, because the internal capacitor of the PD has been sufficiently discharged during the backoff time.

The various logic blocks (e.g., logic blocks 404-416) can be realized using hardware (e.g., integrated circuits) or firmware (e.g., field-programmable gate arrays (FPGAs)). In some aspects, detection-backoff-determination logic block 416 can also be implemented using software logic as part of a host controller communicating with PSE controller 400 via host interface 402. In this scenario, detection-backoff-determination logic block 416 determines a backoff time, in response to PD-detection logic block 410 detecting a PD-detection error. Because the software-based control is triggered by detecting an error, it may be slower than the hardware-based solution. However, the software-based solution can often provide greater flexibility.

Figure 5:
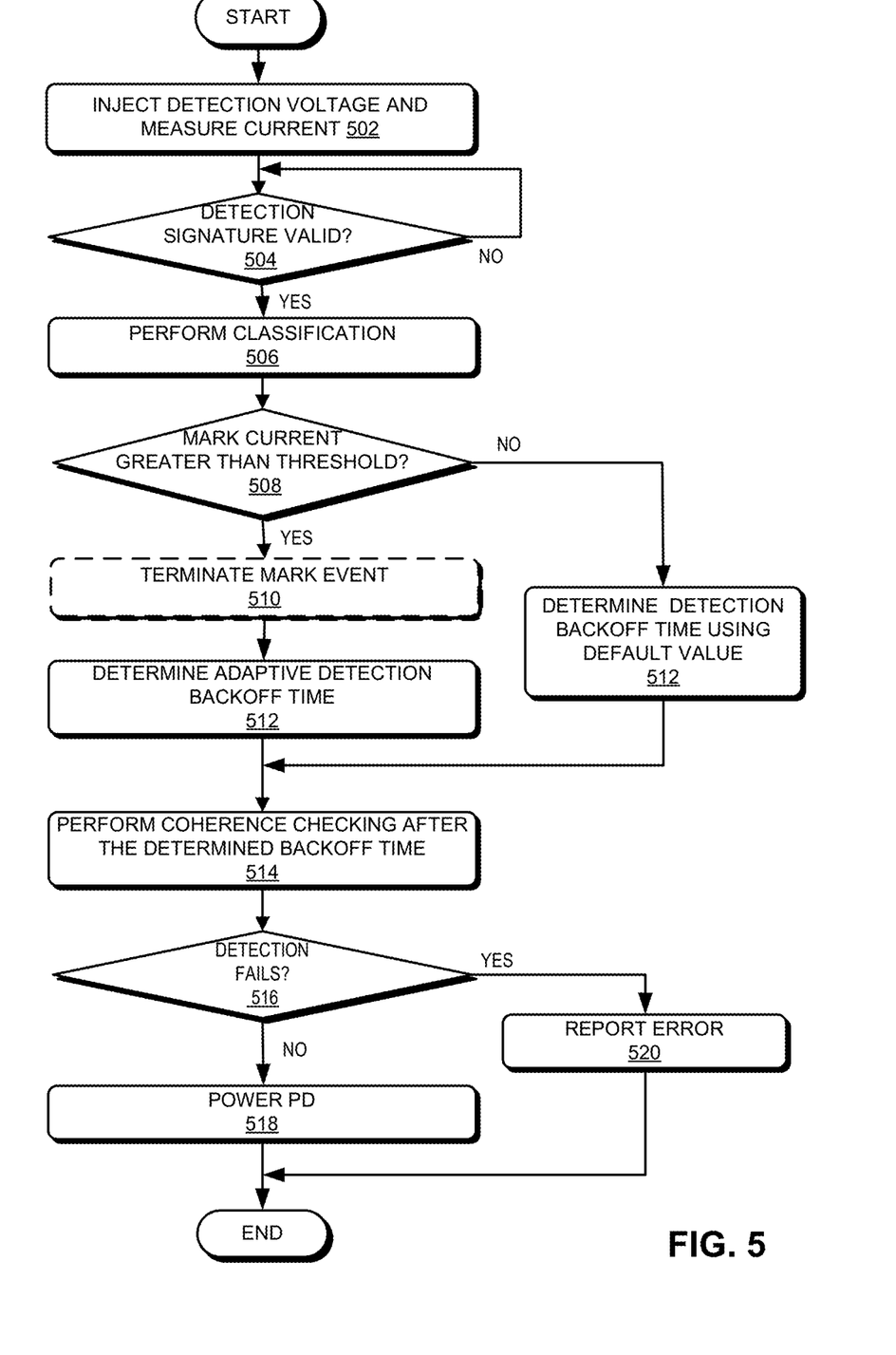
FIG. 5 provides a flowchart illustrating an exemplary process for powering up a device using PoE, according to one aspect of the application.

FIG. 5 provides a flowchart illustrating an exemplary process for powering up a device using PoE, according to one aspect of the application. During operation, a PSE controller injects a detection voltage signal into a connected Ethernet cable and measures the current response (operation 502). According to the PoE standard, the detection voltage is between 2.7 V and 10.1 V, and the detection voltage can have multiple levels. The PSE then determines whether the detection signature, which is the measured current value, is valid (operation 504). If not, the PSE may repeat the detection operation (operation 502). The PSE can be configured to periodically (e.g., every 500 milliseconds) inject detection voltage signals into the Ethernet cable in an attempt to detect a connected device.

If the detection signature is valid (meaning that a valid PD is detected), the PSE performs classification of the PD (operation 506). While performing the classification, the PSE can inject one or more voltage pulses into the Ethernet cable and measures the current response to the voltage pulses. A pulse can be defined by a higher level voltage (referred to as the class voltage) and a lower level voltage (referred to as the mark voltage). The current response to the class voltage indicates the power class requested by the PD. The PSE determines whether the mark current (i.e., the current response to the mark voltage) is greater than a predetermined threshold (operation 508). Note that, when a legacy type 1 PD (e.g., a PD compliant with the IEEE 802.3af standard but not the later standards) is coupled to a type 3 or type 4 PSE, the legacy type 1 PD may attempt to power up during the mark event, causing spikes of the mark current. The PSE can measure the peaks of the current spikes or measure the average of the mark current, and compare the measurement with the predetermined threshold value. In one example, the threshold value can be twice the maximum value of the mark current defined by the PoE standard. Note that not all type 1 PDs attempt to power up during the mark event. If a type 1 PD can recognize that the mark voltage is below the voltage needed for powering up, it may not power up and no current spike will be observed.

If the mark current exceeds the threshold, the PSE can optionally terminate the mark event (e.g., stop injecting the mark voltage) (operation 510). Terminating the mark event earlier event can reduce the amount of charge accumulated at the internal capacitor of the PD, thus reducing the amount of time needed to discharge the capacitor. The PSE can further determine the adaptive detection backoff time (operation 512). In one aspect, the PSE can compute the amount of time needed to discharge the internal capacitor of the PD based on the duration of the mark event (i.e., the time used to charge the capacitor) and the maximum capacitance of the PD defined by the PoE standard. Alternatively, the PSE can use the number of observed current spikes and maximum capacitance of the PD to compute the capacitor discharge time. The adaptive detection backoff time can be the computed discharge time plus a predetermined buffer, which can be a fixed amount or a fraction of the discharge time. In a further aspect, the PSE can compare the adaptive detection backoff time with a default backoff time (which can be a few hundred milliseconds) and choose the longer one of the two as the determined detection backoff time. This can ensure a minimum delay is applied to the coherence-checking procedure. If the mark current does not exceed the threshold, the PSE can determine the detection backoff time using the default value.

After the determined backoff time (adaptive or default), the PSE can perform the coherence-checking operation, which is to repeat the detection-and-classification of the PD (operation 514). The PSE can determine whether the detection fails (operation 516). Note that even a partially charged internal capacitor on the PD can cause detection failure. If the detection succeeds, the PSE powers on the PD (operation 518). The PSE may also reset the detection backoff time to its default value after the PD is successfully powered up, such that, when a new PD needs to be powered up, the PSE starts by using the default value to back off the coherence-checking procedure. If the detection fails, the PSE reports an error (operation 520) and ends the operation without powering on the PD. In some aspects, if the detection fails during coherence checking, instead of ending the operation, the PSE may extend the detection backoff time by a predetermined amount and repeat the entire process from the beginning, including the initial detection. The PSE can terminate the operation if a predetermined maximum backoff time (e.g., two or four seconds) is reached.

Most of the operations shown in FIG. 5 can be implemented using hardware. For example, the PD-detection logic, the logic for determining detection backoff time, and the logic for backing off the coherence checking can include hardware logics. In practice, it is also possible to use software logic to perform similar operations.

Figure 6:
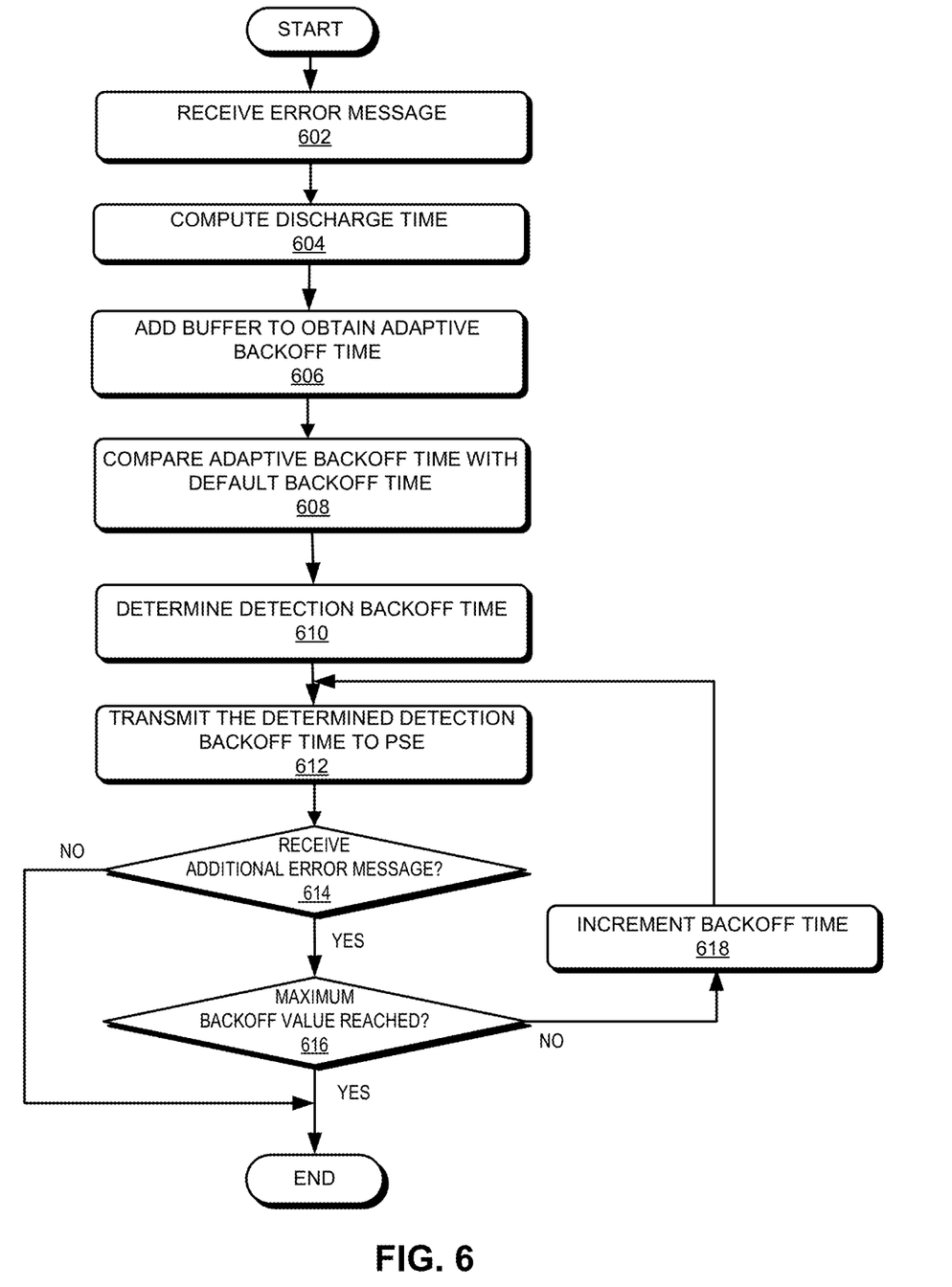
FIG. 6 provides a flowchart illustrating an exemplary process for powering up a device using PoE, according to one aspect of the application.

FIG. 6 provides a flowchart illustrating an exemplary process for powering up a device using PoE, according to one aspect of the application. During operation, the system receives an error message from a PSE controller (operation 602). The error message can indicate that a PD fails detection during the coherence-checking operation performed by the PSE. As discussed previously, a failure in coherence checking may be the result of a mid-plug event or may be caused by a legacy type 1 PD connecting to a type 3 or type 4 PSE.

Upon receiving the error message, the system can compute a time needed for discharging an internal capacitor of the PD (operation 604). This assumes that the failure may be caused by the internal capacitor of the PD being charged during a mark event, which is part of a previous detection-and-classification operation performed on the PD by the PSE. To compute the time needed for discharging the capacitor, the system may estimate the amount of charge on the capacitor based on the duration of the mark event and the maximum possible capacitance value of the capacitor. This provides an upper bound for the charge amount. In an alternative aspect, the system can also monitor the mark current on the PD (i.e., the amount of current drawn from the PD during the mark event) and use the mark current to estimate the charge amount. Based on the charge amount, the system can compute the time needed to discharge the capacitor.

The system can then add a buffer time to the computed discharge time to obtain an adaptive backoff time for a subsequent detection operation (operation 606). The buffer time can be a fixed amount or a variable amount that depends on the computed discharge time. For example, the buffer time can be 20% of the discharge time. Adding the buffer time to the discharge time can ensure that the capacitor on the PD can be completely discharged, because even a partially charged capacitor may cause the detection to fail. The system can compare the computed detection backoff time with a default backoff time (operation 608) and determines that the detection backoff time is the longer one of the two (operation 610). Note that the default backoff time can be a predetermined minimum time interval between consecutive detection-and-classification cycles.

The system can transmit the determined detection backoff time to the PSE controller to allow the PSE controller to delay a subsequent detection operation based on the determined detection backoff time (operation 612) and determines if an additional error message is received (operation 614).

Note that, if the detection failure during coherence checking results from the capacitor of a legacy type 1 PD being charged, and if delaying the subsequent detection operation by the determined backoff amount can sufficiently discharge the capacitor, the subsequent detection operation will be successful and the PD can be powered up. On the other hand, if the capacitor is sufficiently discharged, or if the detection failure during coherence checking results from a mid-plug event, delaying the subsequent detection operation by the determined backoff time may not fix the problem. Consequently, the system may receive an additional error message. If the additional error message is received, the system can determine whether a predetermined maximum backoff value has been reached (operation 616). If so, the operation ends. If not, the system can increment the previously determined backoff time by a predetermined amount (operation 618) and send the incremented backoff time to the PSE controller to allow the PSE controller to delay a subsequent detection operation (operation 612). The system can extend the backoff time by a fixed amount or a percentage.

Figure 7:
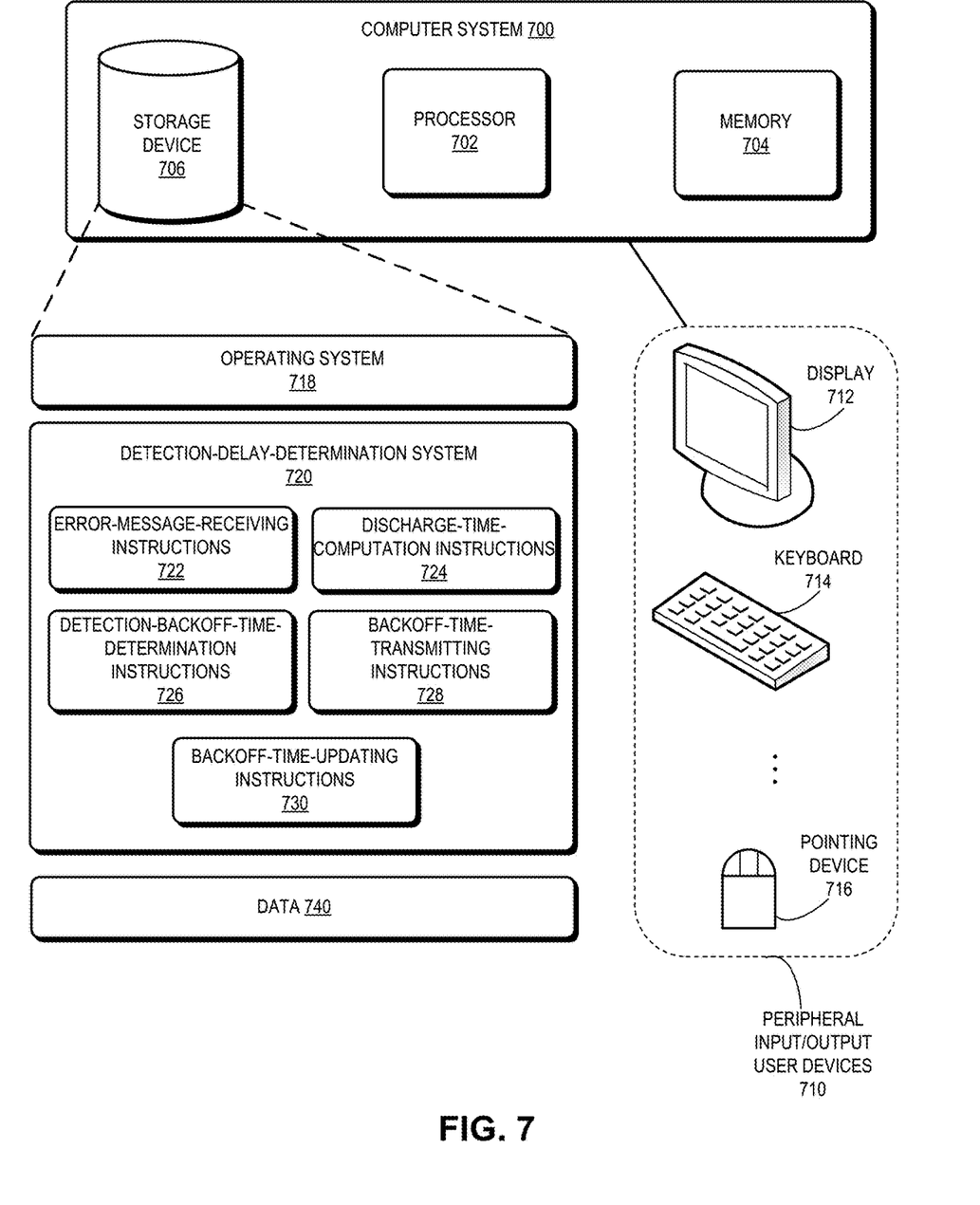
FIG. 7 illustrates an exemplary computer system that facilitates determining, adaptively, a time delay between consecutive detection-and-classification cycles in a power-over-Ethernet (PoE) system, according to one aspect of the application.

FIG. 7 illustrates an exemplary computer system that facilitates determining, adaptively, a time delay between consecutive detection-and-classification cycles in a power-over-Ethernet (PoE) system, according to one aspect of the application. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 718, a detection-delay-determination system 720, and data 740.

Detection-delay-determination system 720 can include instructions, which when executed by computer system 700, can cause computer system 700 or processor 702 to perform methods and/or processes described in this disclosure. Specifically, detection-delay-determination system 720 can include instructions for receiving an error message from a PSE controller (error-message-receiving instructions 722), instructions for computing time needed to discharge an internal capacitor on a PD coupled to the PSE (discharge-time-computation instructions 724), instructions for determining the backoff time for a subsequent detection operation (detection-backoff-time-determination instructions 726), instructions for transmitting the determined backoff time to the PSE controller (backoff-time-transmitting instructions 728), and instructions for updating the determined backoff time (backoff-time-updating instructions 730).

In general, this disclosure provides a solution to the problem of enabling backward compatibility of PSE controllers. More particularly, the disclosed system and method allows a PSE controller compliant with a newer generation PoE standard (e.g., IEEE 802.3bt) to provide power to any legacy type 1 PD compliant with an earlier generation PoE standard (e.g., IEEE 802.af), without significant performance degradation. When a legacy type 1 PD is connected to a type 3 or type 4 PSE, the legacy type 1 PD may fail to power up, because the input capacitor of the legacy type 1

PD can be charged during the classification stage of an initial detection-and-classification cycle, causing the legacy type 1 PD to fail detection at a subsequent detection-and-classification cycle. To solve this problem, the system can adaptively back off the detection-and-classification cycle, in response to detecting the detection error or in response to determining that the mark current on the PD exceeds a predetermined threshold. Backing off the next detection-and-classification cycle allows the PD capacitor to discharge, thus facilitating the PD to provide a valid detection signature during the next detection-and-classification cycle. Once the PD is validated, the PSE can successfully power up the PD according to the power class requested by the PD.

One aspect provides a power sourcing equipment controller for providing power to a powered device using power-over-Ethernet (PoE). The power sourcing equipment includes a voltage-output logic block to output a sequence of voltage signals, the voltage signals comprising at least a detection signal and a classification signal; a current-measurement logic block to measure current provided responsive to the voltage signals; a backoff-time-determination logic block to determine a backoff time in response to the current-measurement logic block detecting the provided current exceeding a predetermined threshold, the backoff time being determined based on an amount of time needed for discharging an internal capacitor associated with the powered device; and a timing logic block to cause the voltage-output logic block to delay the output of a next sequence of voltage signals based on the determined backoff time, thereby facilitating powering up of a device compliant with a different PoE standard.

In a variation on this aspect, the device being powered up is a legacy type 1 device compliant with IEEE 802.3af standard, and the power sourcing equipment controller is compliant with IEEE 802.3bt standard.

In a variation on this aspect, the backoff-time-determination logic block is to compute the amount of time needed for discharging the internal capacitor based on a charging duration of the internal capacitor and a maximum allowed value of the internal capacitor.

In a further aspect, the internal capacitor is charged by current responsive to the classification signal, and the voltage-output logic block is to reduce a duration for outputting the classification signal in response to the current-measurement logic block detecting that the provided current exceeding the predetermined threshold.

In a further aspect, the backoff-time-determination logic block is to determine the backoff time by: obtaining an adaptive backoff time by adding a buffer to the computed amount of time needed for discharging the internal capacitor; and comparing the adaptive backoff time with a default backoff time.

In a variation on this aspect, the backoff-time-determination logic block is to compute the amount of time needed for discharging the internal capacitor based on a number of current spikes observed by the current-measurement logic block and a maximum allowed value of the internal capacitor.

In a variation on this aspect, the power sourcing equipment controller can further include a host interface to communicate with a host controller. The host interface is to send an error message to the host controller in response to the current-measurement logic block detecting that current responsive to the detection signal is outside of a predetermined range.

In a further aspect, the host interface comprises an Inter-Integrated Circuit (I2C) interface.

In a further aspect, the host interface is to receive, from the host controller, a backoff time used to delay the voltage-output logic block to output the next sequence of voltage signals.

In a variation on this aspect, the backoff-time-determination logic block is to increment the determined backoff time in response to the current-measurement logic block detecting that current responsive to the detection signal in the next sequence of voltage signals is outside of a predetermined range.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A power sourcing equipment controller for providing power using power-over-Ethernet (PoE), the power sourcing equipment controller comprising:
   a voltage-output logic block to output a sequence of voltage signals, wherein the voltage signals comprise at least a detection signal and a classification signal;
   a current-measurement logic block to measure current provided responsive to the voltage signals;
   a backoff-time-determination logic block to determine a backoff time in response to the current-measurement logic block detecting the provided current exceeding a predetermined threshold, wherein the backoff time is determined based on an amount of time needed for discharging an internal capacitor associated with the powered device; and
   a timing logic block to cause the voltage-output logic block to delay the output of a next sequence of voltage signals based on the determined backoff time, thereby facilitating powering up of a device compliant with a different PoE standard.

2. The power sourcing equipment controller of claim 1, wherein the device being powered up is a legacy type 1 device compliant with IEEE 802.3af standard, and wherein the power sourcing equipment controller is compliant with IEEE 802.3bt standard.

3. The power sourcing equipment controller of claim 1, wherein the backoff-time-determination logic block is to compute the amount of time needed for discharging the internal capacitor based on a charging duration of the internal capacitor and a maximum allowed value of the internal capacitor.

4. The power sourcing equipment controller of claim 3, wherein the internal capacitor is charged by current responsive to the classification signal, and wherein the voltage-output logic block is to reduce a duration for outputting the classification signal in response to the current-measurement logic block detecting the provided current exceeding the predetermined threshold.

5. The power sourcing equipment controller of claim 3, wherein the backoff-time-determination logic block is to determine the backoff time by:
obtaining an adaptive backoff time by adding a buffer to the computed amount of time needed for discharging the internal capacitor; and
comparing the adaptive backoff time with a default backoff time.

6. The power sourcing equipment controller of claim 1, wherein the backoff-time-determination logic block is to compute the amount of time needed for discharging the internal capacitor based on a number of current spikes observed by the current-measurement logic block and a maximum allowed value of the internal capacitor.

7. The power sourcing equipment controller of claim 1, further comprising a host interface to communicate with a host controller, wherein the host interface is to send an error message to the host controller in response to the current-measurement logic block detecting that current responsive to the detection signal is outside of a predetermined range.

8. The power sourcing equipment controller of claim 7, wherein the host interface comprises an Inter-Integrated Circuit ($I^2C$) interface.

9. The power sourcing equipment controller of claim 7, wherein the host interface is to receive, from the host controller, a backoff time used to delay the voltage-output logic block to output the next sequence of voltage signals.

10. The power sourcing equipment controller of claim 1, wherein the backoff-time-determination logic block is to increment the determined backoff time in response to the current-measurement logic block detecting that current responsive to the detection signal in the next sequence of voltage signals is outside of a predetermined range.

11. A method for providing power from a power sourcing equipment controller using power-over-Ethernet (PoE), the method comprising:
outputting, by the power sourcing equipment controller, a sequence of voltage signals, wherein the voltage signals comprise at least a detection signal and a classification signal;
measuring current provided responsive to the voltage signals;
determining a backoff time in response to detecting the provided current exceeding a predetermined threshold, wherein determining the backoff time comprises computing an amount of time needed for discharging an internal capacitor associated with the powered device; and
delaying a next sequence of voltage signals based on the determined backoff time, thereby facilitating powering up a device compliant with a different PoE standard.

12. The method of claim 11, wherein the device being powered up is a legacy type 1 device compliant with IEEE 802.3af standard, and wherein the power sourcing equipment controller is compliant with IEEE 802.3bt standard.

13. The method of claim 11, wherein the amount of time needed for discharging the internal capacitor is computed based on a charging duration of the internal capacitor and a maximum allowed value of the internal capacitor.

14. The method of claim 13,
wherein the internal capacitor is charged by current responsive to the classification signal; and
wherein the method further comprises reducing a duration for outputting the classification signal in response to the current-measurement logic block detecting that the provided current exceeding the predetermined threshold.

15. The method of claim 13, wherein determining the backoff time comprises:
obtaining an adaptive backoff time by adding a buffer to the computed amount of time needed for discharging the internal capacitor; and
comparing the adaptive backoff time with a default backoff time.

16. The method of claim 11, wherein the amount of time needed for discharging the internal capacitor is computed based on a number of current spikes observed by the current-measurement logic block and a maximum allowed value of the internal capacitor.

17. The method of claim 11, further comprising:
sending, by a host interface to a host controller, an error message, in response to detecting that current responsive to the detection signal is outside of a predetermined range.

18. The method of claim 17, wherein the host interface comprises an Inter-Integrated Circuit ($I^2C$) interface.

19. The method of claim 17, further comprising receiving, from the host controller via the host interface, a backoff time used to delay the voltage-output output logic block to output the next sequence of voltage signals.

20. The method of claim 11, further comprising:
incrementing the determined backoff time in response to detecting that current responsive to the detection signal in the next sequence of voltage signals is outside of a predetermined range.

* * * * *